(No Model.)
A. J. BEAUDETTE.
BEARING FOR PROPELLER SHAFTS.
No. 520,291. Patented May 22, 1894.
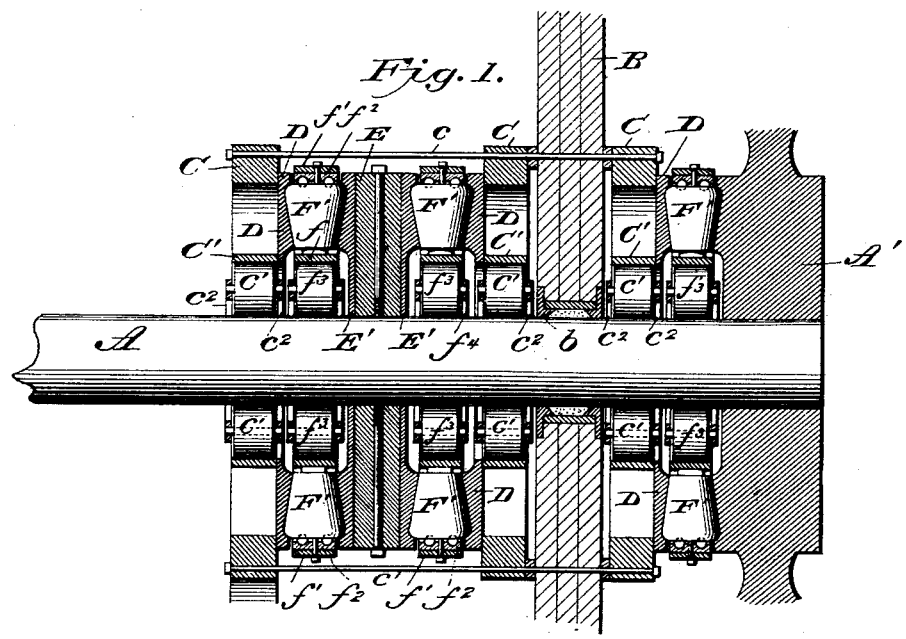
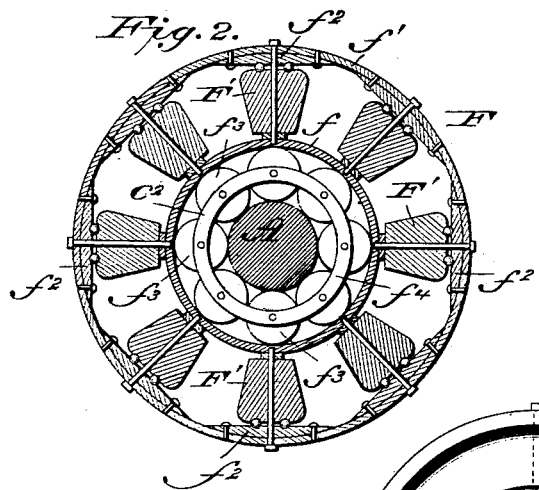
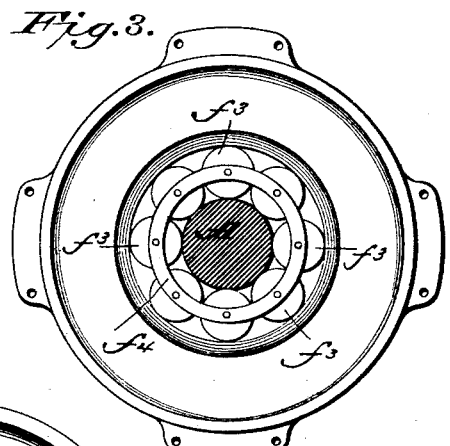
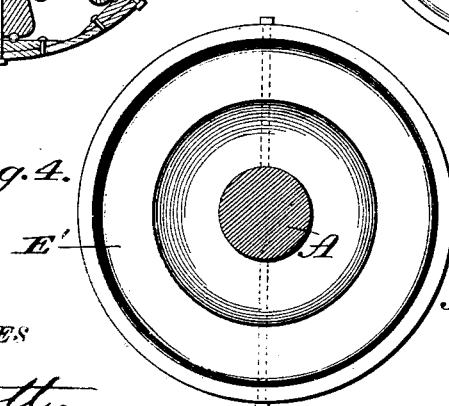
WITNESSES
G. S. Elliott
T. W. Johnson
Agide J. Beaudette
INVENTOR
by 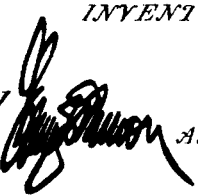 Attorney

United States Patent Office.

AGIDE J. BEAUDETTE, OF PELICAN LAKE, WISCONSIN.

BEARING FOR PROPELLER-SHAFTS.

SPECIFICATION forming part of Letters Patent No. 520,291, dated May 22, 1894.

Application filed February 1, 1894. Serial No. 498,772. (No model.)

*To all whom it may concern:*

Be it known that I, AGIDE J. BEAUDETTE, a citizen of the United States of America, residing at Pelican Lake, in the county of Forest and State of Wisconsin, have invented certain new and useful Improvements in Bearings for Propeller-Shafts; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide means for reducing the friction of propeller shafts on their bearings and at the same time permit the bearings to be taken up to compensate for wear or lost motion; and it consists in the improved construction and combination of the parts, as will be hereinafter fully set forth and particularly pointed out in the claims.

In the accompanying drawings, Figure 1 is a longitudinal sectional view of a shaft bearing designed especially for propeller shafts and constructed in accordance with my invention. Fig. 2 is a vertical sectional view through the line 2—2 of Fig. 1. Fig. 3 is a view of one of the bearing-plates and center roller-bearing, and Fig. 4 is a side view of the collar which is rigidly secured to the shaft.

A designates the shaft to which the propeller A' is secured in any suitable manner. The propeller-shaft passes through the frame of the vessel, and surrounding said shaft is a suitable boxing $b$.

C C designate supporting frames which are rigidly secured to each other by tie-bolts $c$, and these frames are provided with rings C' upon the inner surfaces of which bear rollers $c'$, the rollers having suitable journals which bear in rings or bands $c^2$ so that they will be held apart. It will be noted that the several frames C are of substantially the same construction, and that the rollers $c'$ bear upon the propeller shaft and against the rings C'. To the frames C are fixed rigidly plates D having flanges through which pass the means for securing them to said frames. These plates have bearing surfaces against which conical rollers bear, which will be hereinafter described, and the bearing surfaces are grooved to receive the conical rollers and lie over the outer ends of the same to retain them in position.

E designates a collar to the sides of which are secured disks E' having bearing surfaces which correspond with the bearing surfaces of the plates D, and this collar is rigidly secured to the propeller-shaft A. If found desirable the hub of the propeller may be constructed so that the inner face of the same will form the equivalent of one of the disks E', or a collar E with a bearing-plate or disk E' may be secured to the shaft at that point.

F designates the anti-friction bearings which consist of inner rings $f$ and outer rings $f'$, the outer ring of each bearing having attached to the inner face thereof suitable plates $f^2$ which provide flat bearing surfaces on a line with the conical rollers F', and these plates are grooved or recessed for the reception of balls, corresponding grooves or recesses being formed in the ends of the rollers, and at the opposite ends of the rollers are placed washers. These conical rollers F' turn on independent shafts which pass through the inner and outer rings $f$ and $f'$. Within the ring $f$ are located a number of cylindrical rollers $f^3$ provided with stub shafts which are journaled in rings $f^4$, and these rollers bear against the inner ring $f$ and upon the propeller-shaft A.

The rollers $c'$ and $f^3$ provide an anti-friction bearing for the propeller-shaft, and the conical rollers F' take up any fore or aft thrust.

In practice the greatest amount of wear upon the bearings of a propeller-shaft is in the direction of its length, and the conical rollers provide the maximum amount of bearing surface.

If desired the anti-friction bearings hereinbefore described may be located entirely within the hull of the vessel.

I am aware that prior to my invention it has been proposed to provide shafts of propeller wheels with anti-friction bearings comprising in part a central fixed collar with grooves or recesses and corresponding collars which are adjustable toward each other upon the shaft to provide an anti-friction thrust roller-bearing, and I do not claim such construction broadly; neither do I claim broadly a bearing for propeller-shafts having cylindrical anti-friction rollers; but What I do claim as new is—

1. In a thrust-bearing for propeller-shafts, the combination, of a shaft having collars E fixedly attached thereto, disks or plates E' rigidly secured to said collars and provided with bearing surfaces, frames C mounted on the shaft and connected to each other by tie-rods as described, plates D rigidly secured to the frames C and provided with bearing surfaces, conical anti-friction rollers F' journaled between the bearing plates D and E' upon shafts which extend through rings $f$ and $f'$, and rollers $f^3$ adapted to bear upon the main shaft and against the inner rings to which the conical rollers are connected, substantially as shown and for the purpose set forth.

2. In a thrust-bearing for propeller-shafts, the combination, of a shaft having collars E fixedly attached thereto, disks or plates E' rigidly secured to said collars and provided with bearing surfaces, frames C mounted on the main shaft and connected to each other by tie-rods, plates D rigidly secured to the frames C and provided with bearing surfaces which correspond with the bearing surfaces of the disks or plates E', and conical rollers F' journaled between the plates D and E' upon shafts which extend through rings $f$ and $f'$, the bearing surfaces of the plates D and E' being grooved to receive the conical rollers F' and lie over the outer ends of the same, substantially as shown, and for the purpose set forth.

In testimony whereof I affix my signature in presence of two witnesses.

AGIDE J. BEAUDETTE.

Witnesses:
O. M. STAFFORD,
ODD SCHOEPKE.